US009471900B1

United States Patent
Boustany

(10) Patent No.: US 9,471,900 B1
(45) Date of Patent: Oct. 18, 2016

(54) SYSTEM AND METHOD FOR WORKFORCE DATA MANAGEMENT

(71) Applicant: Genesys Impact, LLC, Washington, DC (US)

(72) Inventor: Jad Boustany, Washington, DC (US)

(73) Assignee: Genesys Impact, LLC, Washington, DC (US)

( * ) Notice: Subject to any disclaimer, the term of this patent is extended or adjusted under 35 U.S.C. 154(b) by 51 days.

(21) Appl. No.: 14/829,101

(22) Filed: Aug. 18, 2015

(51) Int. Cl.
*G06Q 10/00* (2012.01)
*G06Q 10/10* (2012.01)
*G06Q 20/00* (2012.01)
*G06G 1/14* (2006.01)
*G06Q 30/00* (2012.01)
*G06F 15/02* (2006.01)
*G07C 1/10* (2006.01)

(52) U.S. Cl.
CPC .................. *G06Q 10/1091* (2013.01)

(58) Field of Classification Search
USPC ..................................................... 705/22, 28
See application file for complete search history.

(56) References Cited

U.S. PATENT DOCUMENTS

| | | | | |
|---|---|---|---|---|
| 5,794,148 A * | 8/1998 | Mamaghani | .......... | H04W 36/30 455/226.2 |
| 8,626,545 B2 | 1/2014 | Van Pelt et al. | | |
| 8,712,882 B2 | 4/2014 | Niazi | | |
| 8,738,024 B1 * | 5/2014 | Kerr | ....... | G01S 5/0252 342/458 |
| 8,934,923 B1 * | 1/2015 | Golden | ................ | A01K 11/008 455/426.1 |
| 9,020,848 B1 * | 4/2015 | Ridge | .................. | G06Q 40/125 705/32 |
| 9,225,789 B2 * | 12/2015 | Jensen | .................... | H04L 51/32 |
| 2004/0146093 A1 * | 7/2004 | Olson | .................. | H04B 1/7105 375/148 |
| 2006/0181411 A1 * | 8/2006 | Fast | ...................... | G01S 5/0018 340/539.13 |
| 2007/0015522 A1 * | 1/2007 | Ruutu | ..................... | H04W 4/02 455/456.3 |
| 2007/0281617 A1 * | 12/2007 | Meylan | ................. | H04W 16/14 455/41.2 |
| 2008/0177646 A1 | 7/2008 | Frink | | |
| 2009/0170528 A1 * | 7/2009 | Bull | ....................... | H04W 4/021 455/456.2 |
| 2010/0242103 A1 * | 9/2010 | Richardson | ....... | H04W 36/0061 726/7 |
| 2011/0022433 A1 * | 1/2011 | Nielsen | ................... | G06Q 10/06 705/7.27 |
| 2013/0182603 A1 * | 7/2013 | Twell | ..................... | H04W 64/00 370/252 |
| 2013/0231137 A1 * | 9/2013 | Hugie | .................... | H04W 24/00 455/456.3 |
| 2013/0281084 A1 * | 10/2013 | Batada | ................... | H04W 88/06 455/426.1 |
| 2013/0290200 A1 | 10/2013 | Singhal et al. | | |
| 2014/0135042 A1 * | 5/2014 | Buchheim | ................. | G01S 1/68 455/456.6 |
| 2014/0278645 A1 * | 9/2014 | Davidson | ....... | G06Q 10/063114 705/7.15 |
| 2014/0279123 A1 * | 9/2014 | Harkey | .................... | H04L 67/18 705/26.1 |
| 2015/0095171 A1 | 4/2015 | Morgan et al. | | |
| 2015/0201306 A1 * | 7/2015 | Kazemi | ................. | H04W 4/022 455/456.1 |
| 2015/0363745 A1 * | 12/2015 | Hatch | ................ | G06Q 10/1091 705/32 |

* cited by examiner

*Primary Examiner* — Ig T An
(74) *Attorney, Agent, or Firm* — Arc IP Law, PC; Joseph J. Mayo

(57) ABSTRACT

Embodiments include a system and method of workforce data management including a wearable device, a scanner and a database server. The scanner emits a radius to identify an area around the wearable device, scans the area to detect the wearable device and transmits outgoing data to the wearable device. The scanner receives incoming data from the wearable device, processes the incoming data, and filters the incoming data to qualify accuracy of the incoming data. After filtering the incoming data, the scanner determines whether a portion of the incoming data includes accurate data capture. When the portion of the incoming data includes accurate data capture, the scanner outputs a corresponding trust score and transmits the portion of the incoming data to the database server. When the portion of the incoming data includes inaccurate data capture, the scanner outputs a corresponding trust score and awaits further action from the wearable device.

20 Claims, 7 Drawing Sheets

SYSTEM AND METHOD FOR WORKFORCE DATA MANAGEMENT

BACKGROUND OF THE INVENTION

1. Field of the Invention

Embodiments of the invention generally relate to systems and methods of workforce data management to remotely acquire data associated with employees in an automated manner over a wireless network. Embodiments enable employee time management, expense and budget management, safety and security solutions and asset control within a predefined workforce environment.

2. Description of the Related Art

Generally, tracking employees in a given workforce environment enable companies to manage clock-ins and clock-outs of employees during scheduled time frames to ensure employees are working during their allotted time schedules.

Typically, work sites include a vast amount of entries and exits during a work period, as well as movement from one location to another within an enclosed environment. Generally, tracking employees' movements and tasks within a workforce environment requires constant monitoring. Typically, it is difficult to accurately capture the time and attendance of an employee during working hours, idle time of an employee during working hours, and therefrom accurately submitting timestamps for payroll and accounting. Generally, time-keeping of multiple employees in a given worksite raises a risk of credibility and accuracy of the timestamps obtained from each employee.

For example, U.S. Pat. No. 9,020,848, entitled "Method and System for Time and Location Tracking", to Ridge et al., discloses a method of tracking time and location of an employee based on a predefined schedule using a time tracking software installed on a mobile device. According to Ridge et al., the time tracking software enables detection of the presence, or lack of presence, of an electronic signal emitted by a near field communication, Bluetooth® low energy or other wireless device to trigger the mobile application to communicate to a server to determine if the employee is scheduled to work at a work zone to clock-in and/or clock-out the employee. However, the system of Ridge et al. appears to lack any teaching or suggestion of determining the accuracy of the time and location data acquired via a wearable device to automatically and appropriately aggregate data obtained from the wearable device to clock-in and/or clock-out the employees.

United States Patent Publication 20130290200, entitled "Systems and Methods of Compliance Tracking", to Singhal et al., appears to disclose a system and method that provides automated compliance and operations management services, wherein user tracking information may be received and stored. According to Singhal et al., the time tracking information may be analyzed to generate information for compliance or operations management to automate the process of monitoring, collecting, storing, analyzing and utilizing data and information. However, the system of Singhal et al. appears to lack any teaching or suggestion of determining the accuracy of the time and location data acquired via a wearable device to automatically and appropriately aggregate data obtained from the wearable device to clock-in and/or clock-out the employees based on one or more conditions of the employees and the wearable device thereof.

For example, U.S. Pat. No. 8,626,545, entitled "Predicting Future Performance of Multiple Workers on Crowdsourcing Tasks and Selecting Repeated Crowdsourcing Workers", to Van Pelt et al., appears to disclose a system and method of a job distribution platform for aggregating performance data in a worker profile for workers in performing crowd source tasks. According to Van Pelt et al., the tasks may span current jobs and a history of pervious jobs distributed to the worker and the job performance data for the worker is collected for current and previous jobs, such that new jobs may be assigned to a worker selected based on performance data of the worker. However, the system of Van Pelt et al. appears to lack any teaching or suggestion of determining the accuracy of the data acquired to automatically and appropriately aggregate data obtained from the wearable device clock-in and/or clock-out the workers based on one or more conditions of the employees and the wearable device thereof.

U.S. Pat. No. 8,712,882 entitled "Predictive Time Entry for Workforce Management Systems", to Niazi, appears to disclose methods and system for predictive approaches used to auto-populate timecards for and employee/contractor. According to Niazi, the systems and methods include a framework that may auto-populate timecards for employees using predictive approaches such as by looking at the patterns of time entry for the individual performing an entry of the time, and patterns of time entry of other team members within an organization. However, the system of Niazi appears to lack any teaching or suggestion of determining the accuracy of the data acquired to automatically and appropriately aggregate data obtained from the wearable device to clock-in and/or clock-out the workers based on one or more conditions of the employees and the wearable device thereof.

For example, United States Patent Publication 20080177646, entitled "Work Site Remote Monitoring and Employee Time Tracking System and Method", to Frink, appears to disclose a work site monitoring and employee time tracking system that includes a router for transporting data to and from the work site and a work site IP camera in communication with the router for transporting images from the work site to client computers. According to Frink, the system includes a biometric scanner to identify and clock-in and clock-out work site workers and to transmit identification, clock-in and clock-out data to a server computer. However, the system of Frink appears to lack any teaching or suggestion of determining the accuracy of the data acquired to automatically and appropriately aggregate data obtained from the wearable device to clock-in and/or clock-out the workers based on one or more conditions of the employees and the wearable device thereof.

United States Patent Publication 20150095171, entitled "Automated Employee Management Techniques", to Morgan et al., appears to disclose techniques for automated employee management wherein a clock action for an employee is acquired and analyzed based on rules, wherein a decision is made whether to automatically accept the clock action, automatically deny the clock action or interactively request approval from a supervisor for the clock action. However, the system of Morgan et al. appears to lack any teaching or suggestion of determining the accuracy of the data acquired to automatically and appropriately aggregate data obtained from the wearable device to clock-in and/or clock-out the workers based on one or more conditions of the employees and the wearable device thereof.

In view of the above, there is a need for a system and method of workforce management to accurately acquire and process data associated with employees.

BRIEF SUMMARY OF THE INVENTION

Embodiments of the invention generally relate to a system and method of workforce data management. At least one embodiment of the invention includes at least one wearable device with a unique identifier, at least one scanner and a database server.

In one or more embodiments, the at least one wearable device may be worn on one or more of at least one user and at least one piece of equipment associated with the at least one user. In at least one embodiment, the at least one scanner is associated with the at least one wearable device and may be located remote to the to at least one wearable device. In one or more embodiments, the at least one scanner may scan a predefined geographical perimeter to locate the at least one wearable device, and may bi-directionally communicate with the at least one wearable device to collect and record data from each of the at least one wearable device. In at least one embodiment, the at least one scanner may include a trust score algorithm. In one or more embodiments of the invention, the at least one wearable device may include a low-energy wireless beacon device. In at least one embodiment, the at least one scanner may include a low-energy geo-fence scanner that scans a virtual radius defined by the predetermined geographical perimeter.

By way of one or more embodiments, the database server may be located remote to the at least one wearable device and to the at least one scanner. In at least one embodiment of the invention, the database server bi-directionally communicates with the at least one scanner. In one or more embodiments, the database server may include a customer account database that includes a plurality of customer accounts associated with the at least one user.

According to at least one embodiment of the invention, the at least one scanner may one or more of emit a predefined radius, such as a size-controlled pre-defined radius, to identify an area of interest around the at least one wearable device, scan the area of interest to detect the at least one wearable device and transmits outgoing data packets to each of the at least one wearable device to detect the unique identifier of each of the at least one wearable device. In one or more embodiments, the at least one scanner may receive incoming data packets from each of the at least one wearable device and process the incoming data packets. In at least one embodiment, the at least one scanner may process the incoming data packets by filtering the incoming data packets into a ranking system to qualify accuracy of the incoming data packets associated with the at least one wearable device, and, after filtering the incoming data packets, the at least one scanner may determine whether at least one portion of the incoming data packets include accurate data capture.

In one or more embodiments, the at least one scanner may calculate a trust score of the at least one portion of the incoming data packets via the trust score algorithm. By way of at least one embodiment, when the at least one portion of the incoming data packets includes accurate data capture, the at least one scanner may output a corresponding trust score and transmit the at least one portion of the incoming data packets that includes accurate data capture to the database server. In one or more embodiments, when the at least one portion of the incoming data packets includes inaccurate data capture, the at least one scanner may output a corresponding trust score and may await further action from the at least one wearable device.

According to at least one embodiment, the database server may receive the at least one portion of the incoming data packets that includes accurate data capture, and may post the at least one portion of the incoming data packets that includes accurate data capture to a designated customer account of the plurality of customer accounts in the customer account database associated with the at least one user.

In one or more embodiments of the invention, the ranking system may include an accuracy score calculator, wherein the accuracy score calculator includes a predefined threshold over which the incoming data packets are accurate. In at least one embodiment, the at least one scanner may filter the incoming data packets based on the predefined threshold and may output an accuracy score therefrom. In one or more embodiments, the accuracy score may include a range of 0 to 100.

By way of at least one embodiment, the trust score may be calculated based on one or more trust score conditions. In one or more embodiments, the one or more trust score conditions may include an idle time, wherein the incoming data packets include an idle time of the at least one wearable device. In at least one embodiment, the at least one scanner may vary the trust score based on the idle time of the at least one wearable device. As such, in at least one embodiment, when the idle time of the at least one wearable device includes an idle time greater than or equal to a predefined idle time, the at least one scanner may decrease the trust score by a predefined percentage associated with the predefined idle time.

In one or more embodiments of the invention, the one or more trust score conditions may include an overnight idle time, wherein the incoming data packets include an overnight idle time of the at least one wearable device. In at least one embodiment, the at least one scanner may vary the trust score based on the overnight idle time of the at least one wearable device. As such, in at least one embodiment, when the overnight idle time of the at least one wearable device includes an overnight idle time greater than a first predefined overnight idle time, the at least one scanner may decrease the trust score by a first predetermined percentage. In one or more embodiments, when the overnight idle time of the at least one wearable device includes an overnight idle time greater than a second predefined overnight idle time, the at least one scanner may decrease the trust score by a second predetermined percentage. In at least one embodiment, the second predefined overnight idle time may be less than the first predefined overnight idle time, and the second predetermined percentage may be less than the first predetermined percentage. By way of one or more embodiments, when the overnight idle time includes an overnight idle time greater than a third predefined overnight idle time, the at least one scanner may decrease the trust score by a third predetermined percentage. In at least one embodiment, the third predefined overnight idle time may be less than the first predefined overnight idle time and the second predefined overnight idle time, and the third predetermined percentage may be less than the first predetermined percentage and the second predetermined percentage.

In one or more embodiments of the invention, the one or more trust score conditions may include a signal strength, wherein the incoming data packets include a signal strength of the at least one wearable device. In at least one embodiment, the at least one scanner may vary the trust score based on the signal strength of the at least one wearable device. As such, in one or more embodiments, when the signal strength of the at least one wearable device includes a high signal strength, the at least one scanner may increase the trust score. In at least one embodiment, when the signal strength of the at least one wearable device includes a signal strength greater than or equal to a first predefined strength value, the at least one scanner may decrease the trust score by a first predetermined percentage. In one or more embodiments, when the signal strength of the at least one wearable device includes a signal strength equal to a second predefined strength value, the at least one scanner may decrease the trust score by a second predetermined percentage. In at least one embodiment, the second predefined strength value may be less than the first predefined strength value and the second predetermined percentage may be less than the first predetermined percentage.

In one or more embodiments, when the signal strength of the at least one wearable device includes a signal strength equal to a third predefined strength value, the at least one scanner may decrease the trust score by a third predetermined percentage. In at least one embodiment, the third predefined strength value may be less than the first predefined strength value and the second predefined strength value, and the third predetermined percentage may be less than the first predetermined percentage and the second predetermined percentage. In one or more embodiments, when the signal strength of the at least one wearable device includes a signal strength equal to a fourth predefined strength value, the at least one scanner may decrease the trust score by a fourth predetermined percentage. In at least one embodiment, the fourth predefined strength value may be less than the first predefined strength value, the second predefined strength value and the third predefined strength value, and the fourth predetermined percentage may be less than the first predetermined percentage, the second predetermined percentage and the third predetermined percentage.

According to one or more embodiments, the one or more trust score conditions may include a power disconnect, wherein the incoming data packets includes a power disconnect time of the at least one wearable device. In at least one embodiment, the at least one scanner varies the trust score based on the power disconnect time of the at least one wearable device. As such, in one or more embodiments, when the power disconnect time of the at least one wearable device includes a power disconnect time equal to a first predefined disconnect length of time, the at least one scanner may decrease the trust score by a first predetermined percentage. In at least one embodiment, when the power disconnect time of the at least one wearable device includes a power disconnect time equal to a second predefined disconnect length of time, wherein the second predefined disconnect length of time may be less than the first predefined disconnect length of time, the at least one scanner may decrease the trust score by a second predetermined percentage. In at least one embodiment, the second predetermined percentage may be less than the first predetermined percentage. In one or more embodiments, when the power disconnect time of the at least one wearable device includes a power disconnect time equal to a third predefined disconnect length of time, wherein the third predefined disconnect length of time may be less than the first predefined disconnect length of time and the second predefined disconnect length of time, the at least one scanner may decrease the trust score by a third predetermined percentage. In one or more embodiments, the third predetermined percentage may be less than the first predetermined percentage and the second predetermined percentage.

By way of at least one embodiment of the invention, the one or more trust score conditions may include buddy punching, wherein the buddy punching includes the at least one wearable device arriving within a predefined proximity of another wearable device. In one or more embodiments, the incoming data packets may include an average number of buddy punches that include an average number of arrivals between the at least one wearable device and the another wearable device. In at least one embodiment, the at least one scanner may vary the trust score based on the average number of arrivals. As such, in one or more embodiments, when the average number of arrivals includes a number greater than or equal to a first predefined number of arrivals, the at least one scanner may decrease the trust score by a first predetermined percentage. In at least one embodiment, when the average number of arrivals includes a number equal to a second predefined number of arrivals, the at least one scanner may decrease the trust score by a second predetermined percentage. In one or more embodiments, the second predefined number of arrivals may be less than the first predefined number of arrivals, and the second predetermined percentage may be less than the first predetermined percentage.

In at least one embodiment, when the average number of arrivals includes a number equal to a third predefined number of arrivals, the at least one scanner may decrease the trust score by a third predetermined percentage. In one or more embodiments, the third predefined number of arrivals may be less than the first predefined number of arrivals and the second predefined number of arrivals, and the third predetermined percentage may be less than the first predetermined percentage and the second predetermined percentage. In at least one embodiment, when the average number of arrivals includes a number equal to a fourth predefined number of arrivals, the at least one scanner may decrease the trust score by a fourth predetermined percentage. In one or more embodiments, the fourth predefined number of arrivals may be less than the first predefined number of arrivals, the second predefined number of arrivals and the third predefined number of arrivals, and the fourth predetermined percentage may be less than the first predetermined percentage, the second predetermined percentage and the third predetermined percentage.

By way of at least one embodiment of the invention, the at least one scanner may include a plurality of scanners. In one or more embodiments, each of the plurality of scanners may emit a pre-defined radius, for example a size-controlled pre-defined radius, to identify a sector of interest around the at least one wearable device. In at least one embodiment, the sector of interest may include at least the area of interest, such that each of the plurality of scanners may bi-directionally communicate with the at least one wearable device. In at least one embodiment, each of the plurality of scanners may include a unique identifier.

According to one or more embodiments, after the database server receives the at least one portion of the incoming data packets, the database server may one or more of automatically approve the incoming data packets, receive approval of the incoming data packets from at least one other user, and receive approval of the incoming data packets from the at least one user. In at least one embodiment of the invention, the database server receives approval of the incoming data packets from one or more of the at least one other user and the at least one user, such that the database server may receive input data from the at least one other user, the at least one user or both the at least one other user and the at least one user.

BRIEF DESCRIPTION OF THE DRAWINGS

The above and other aspects, features and advantages of at least one embodiment of the invention will be more apparent from the following more particular description thereof, presented in conjunction with the following drawings, wherein.

DETAILED DESCRIPTION OF THE INVENTION

The following description is of the best mode presently contemplated for carrying out at least one embodiment of the invention. This description is not to be taken in a limiting sense, but is made merely for the purpose of describing the general principles of the invention. The scope of the invention should be determined with reference to the claims.

Figure 1:
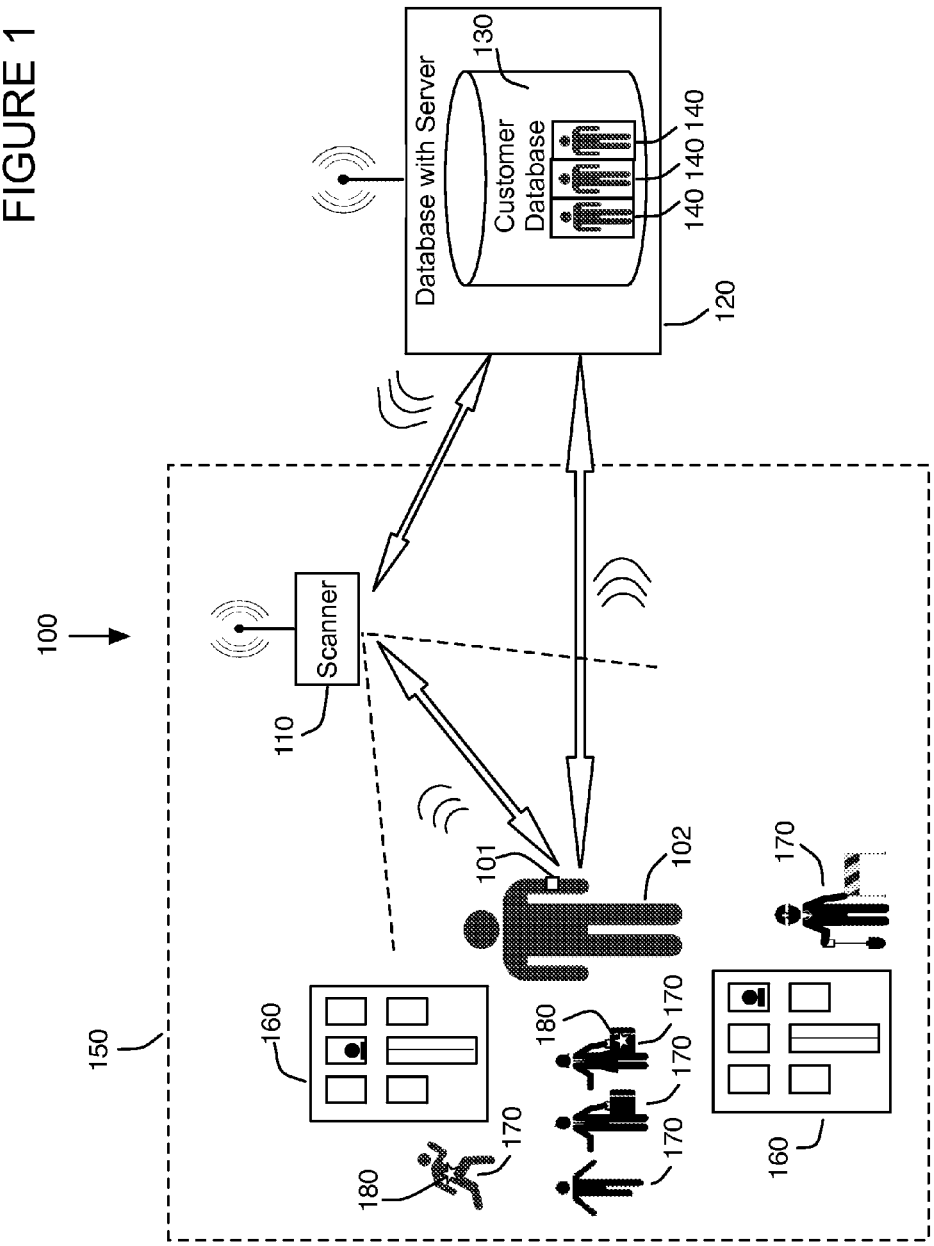
FIG. 1 illustrates the overall architecture of the workforce data management system.

FIG. 1 illustrates the overall architecture of the workforce data management system 100 according to one or more embodiments of the invention. As shown in FIG. 1, at least one embodiment of the invention includes at least one wearable device 101 with a unique identifier, at least one scanner 110, such as a single scanner or a plurality of scanners, and a database server 120.

In one or more embodiments, the at least one wearable device 101 may be worn on one or more of at least one user 102 and at least one piece of equipment associated with the at least one user 102, or may be located near at least one user 102 and at least one piece of equipment associated with the at least one user 102. In one or more embodiments, the at least one wearable device 101 may be a deployable device. In at least one embodiment, the at least one scanner 110 is associated with the at least one wearable device 101 and may be located remote to the to at least one wearable device 101. As shown in FIG. 1, in one or more embodiments, the at least one scanner 110 may scan a predefined geographical perimeter, for example perimeter 150, to locate the at least one wearable device 101, and may bi-directionally communicate with the at least one wearable device 101 to collect and record data from each of the at least one wearable device 101. For example, in one or more embodiments, the data may include one or more of a distance between the at least one wearable device 101 and the at least one scanner 110, and a temperate of the at least one wearable device 101. By way of at least one embodiment, within the perimeter 150, the at least one user may include at least one second or other user 170, and the at least one wearable device may include at least one other wearable device 180 that may be worn on one or more of the at least one other user 170 and/or at least one piece of equipment associated with the at least one other user 170. In one or more embodiments, the perimeter 150 may include one of more buildings 160 such as one or more of a school, university, city, company, campus, museum, exhibit, restaurant, event space, arena, shopping mall, convention center, zoo, casino, and any other public or private environment.

In at least one embodiment, the at least one wearable device 101, 180 is associated with the at least one scanner 110 such that the at least one scanner 110 is switched from an idle or inactive state to an active state upon scanning the at least one wearable device 101, 180.

In one or more embodiments, the at least one scanner 110 may be located within an enclosed indoor workforce environment and/or within an open-perimeter outdoor environment. In at least one embodiment, the at least one scanner 110 may include a trust score algorithm. In one or more embodiments of the invention, the at least one wearable device 101, 180 may include a low-energy beacon device. For example, in at least one embodiment, the at least one wearable device 101, 180, may include Bluetooth®-enabled device, such as a Bluetooth® low-energy device (BLE), that may scan a perimeter, receive incoming data, and transmit outgoing data. In at least one embodiment, the at least one wearable device 101, 180 may include a power source, such as a battery, including a lithium coin battery. In one or more embodiments, the at least one wearable device 101, 180 may include or be associated with an Ethernet port, a WiFi adapter, and may include an enclosure case. In at least one embodiment, the at least one wearable device 101, 180 may scan, receive and transmit data using one or more of a WiFi connection, a cellular connection such as using 3G and 4G capabilities and an Ethernet cable. For example, in one or more embodiments, the at least one wearable device 101, 180 may include one or more of Apple's iBeacon™, a Gimbal™ iBeacon and other types of wireless beacons, and may operate in temperatures ranging from at least 10° F. to at least 100° F.

In at least one embodiment, the at least one scanner 110 may include a low-energy geo-fence scanner that scans a virtual radius defined by the predetermined geographical perimeter 150. For example, in at least one embodiment, the at least one scanner 110 may include a Bluetooth® low-energy device (BLE), or a near field communication (NFC) device, that may scan a perimeter, receive incoming data, and transmit outgoing data. In at least one embodiment, the at least one scanner 110 may include a 900 MHz quad-core ARM Cortex-A7 computer processor. In one or more embodiments, the at least one scanner 110 may include one or more of 1 GB random-access-memory (RAM), at least one universal serial bus (USB) port, such as 4 USB ports, a plurality of general-purpose input/output (GPIO) pins, such as 40 GPIO pins, a full high-definition multimedia interface (HDMI) port, and an Ethernet port. In at least one embodiment, the at least one scanner 110 may include an audio jack, such as a 3.5 mm audio jack, a composite video transmission channel, a camera serial interface (CSI), a display serial interface (DSI), a micro secure digital (SD) card slot and a low-power multimedia processor, such as a VideoCore IV three-dimensional (3D) graphics core.

In one or more embodiments, the at least one scanner 110 may include or be associated with an Ethernet port, a WiFi adapter, and may include an enclosure case. In at least one embodiment, the at least one scanner 110 may scan, receive and transmit data using one or more of a WiFi connection, a cellular connection such as using 3G and 4G capabilities and an Ethernet cable. According to one or more embodiments, one or more of the enclosure case of the at least one wearable device 101, 180 and the at least one scanner 110 may be weatherproof.

By way of at least one embodiment of the invention, the at least one scanner 110 may include a plurality of scanners. In one or more embodiments, each of the plurality of scanners may emit a pre-defined radius, such as a size-controlled pre-defined radius, to identify a sector of interest around the at least one wearable device 101, 180. In at least one embodiment, the sector of interest may include at least the area of interest, such that each of the plurality of scanners may bi-directionally communicate with the at least one wearable device 101, 180. In at least one embodiment, each of the plurality of scanners may include a unique identifier. In one or more embodiments, each of the at least one scanner 110 identifies a sector of interest or geo-fence area, such that each of at least one scanner 110 includes a user-identified string describing the geo-fence area associated with the corresponding scanner of the at least one scanner 110. In one or more embodiments, a combination of each sector of interest enables organization and control of a large physical space by breaking down the large physical space into various sections scanned by the at least one scanner 110. In at least one embodiment, the plurality of scanners enable a Bluetooth® network, such as a mesh network, wherein each node from each scanner of the plurality of scanners relays data within a network defined by the plurality of scanners.

By way of one or more embodiments, the database server 120 may be located remote to the at least one wearable device 101, 180 and to the at least one scanner 110. In at least one embodiment of the invention, the database server 120 bi-directionally communicates with the at least one scanner 110 and with one or more of the at least one wearable device 101, 180 and the at least one user 102 and/or the at least one other user 170. In one or more embodiments, the database server 120 may include a customer account database 130 that includes a plurality of customer accounts 140 associated with the at least one user 102 and/or the at least one other user 170. In one or more embodiments, the database server 120 may include a computer with both hardware and software components, including a database, a server associated with the database, and an application programming interface (API), such as a workforce data management software and/or a centralized, for example cloud-based, web application, to receive, process, allocate and transmit data packets. In at least one embodiment of the invention, the API may include the customer account database 130 that includes the plurality of customer accounts 140. According to one or more embodiments of the invention, one or more of the API and the centralized web-application may perform functions of the database server 120 discussed herein.

Figure 2:
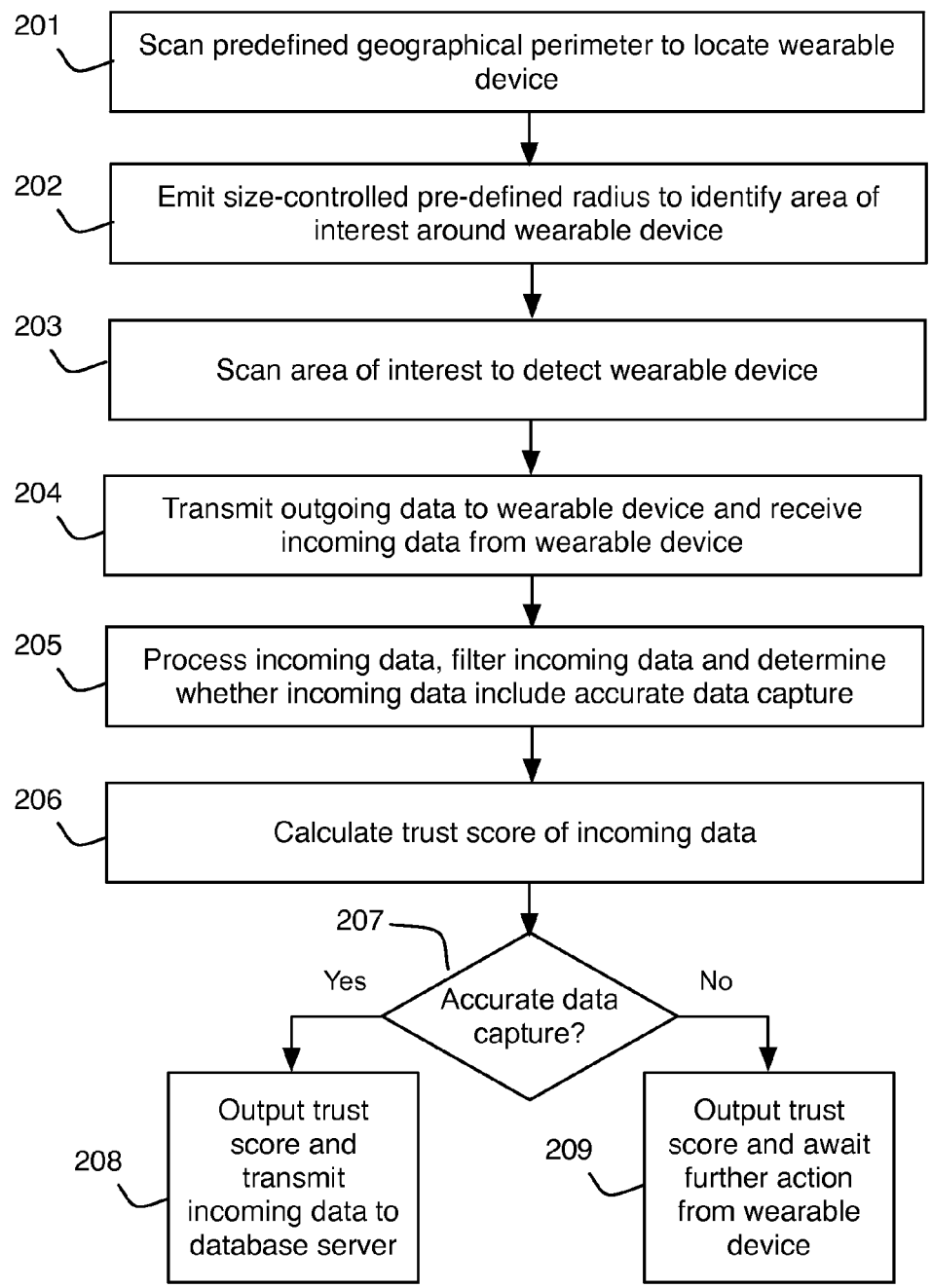
FIG. 2 illustrates an exemplary flowchart of the workforce data management system using a scanner.

FIG. 2 illustrates an exemplary flowchart of the workforce data management system using a scanner, according to one or more embodiments of the invention. As shown in FIG. 2, in at least one embodiment, at 201, the at least one scanner 110 may scan the predefined geographical perimeter, such as perimeter 150, to locate the at least one wearable device 101, 180. According to at least one embodiment of the invention, at 202, the at least one scanner 110 may one or more of emit a pre-defined radius, for example a virtual size-controlled pre-defined radius, to identify an area of interest around the at least one wearable device 101, 180, scan the area of interest to detect the at least one wearable device 101, 180, at 203, and transmits outgoing data packets to each of the at least one wearable device 101, 180 to detect the unique identifier of each of the at least one wearable device 101, 180, at 204. For example, in one or more embodiments, data is transmitted from the at least one scanner 110 to the database server 120 to identify one or more of the at least one wearable device 101, 180, to determine and identify the unique identifier associated with the corresponding at least one wearable device. In one or more embodiments, at 204, the at least one scanner 110 may receive incoming data packets from each of the at least one wearable device 101, 180. In one or more embodiments, the at least one scanner 110 may process the incoming data packets at 205. At 205, in at least one embodiment of the invention, the at least one scanner 110 may process the incoming data packets by filtering the incoming data packets into a ranking system to qualify accuracy of the incoming data packets associated with the at least one wearable device 101, 180, and, after filtering the incoming data packets, the at least one scanner 110 may determine whether at least one portion of the incoming data packets include accurate data capture.

In one or more embodiments, at 206, the at least one scanner 110 may calculate a trust score of the at least one portion of the incoming data packets via the trust score algorithm. By way of at least one embodiment, when the at least one portion of the incoming data packets includes accurate data capture, based on 207, the at least one scanner 110 may output a corresponding trust score and transmit the at least one portion of the incoming data packets that includes accurate data capture to the database server 120, at 208. In one or more embodiments, when the at least one portion of the incoming data packets includes inaccurate data capture, at 209, the at least one scanner 110 may output a corresponding trust score and may await further action from the at least one wearable device 101, 180. At 209, in one or more embodiments, the at least one scanner 110 may keep the at least one portion of the incoming data packets that includes inaccurate data capture in a local, for example designated and partitioned, database in the at least one scanner 110.

In one or more embodiments of the invention, the ranking system may include an accuracy score calculator, wherein the accuracy score calculator includes a predefined threshold over which the incoming data packets are accurate. In at least one embodiment, the at least one scanner 110 may filter the incoming data packets based on the predefined threshold and may output an accuracy score therefrom. In one or more embodiments, the accuracy score may be human-readable and may include a range of 0 to 100.

Figure 3:
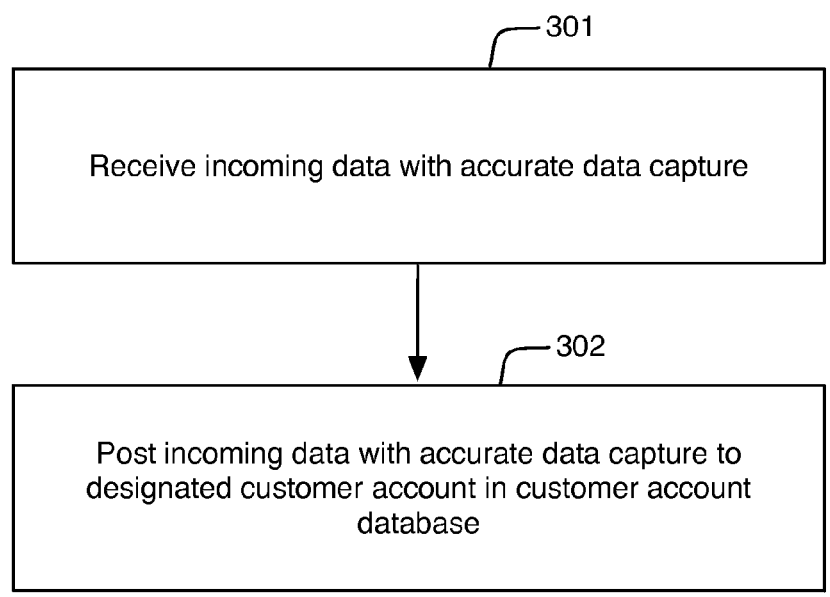
FIG. 3 illustrates an exemplary flowchart of the workforce data management system using a database server.

FIG. 3 illustrates an exemplary flowchart of the workforce data management system using a database server, according to one or more embodiments of the invention. As shown in FIG. 3, by way of at least one embodiment, the database server 120 may receive the at least one portion of the incoming data packets that includes accurate data capture, at 301. In one or more embodiments, at 302, the database server 120 may post the at least one portion of the incoming data packets that includes accurate data capture to a designated customer account of the plurality of customer accounts 140 in the customer account database 130 associated with the at least one user 102.

Figure 4:
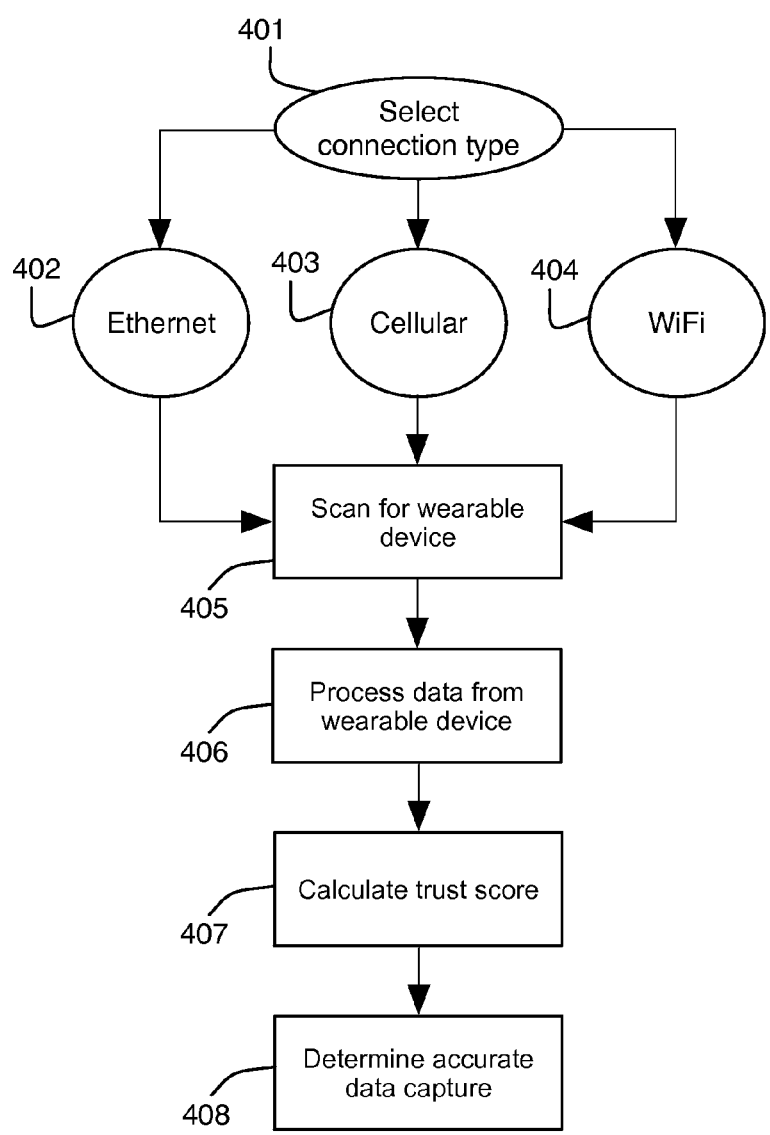
FIG. 4 illustrates an exemplary flowchart of the overall workforce data management time collection and communication process.

FIG. 4 illustrates an exemplary flowchart of the overall workforce data management time collection and communication process, according to one or more embodiments of the invention. In at least one embodiment of the invention, the at least one scanner 110 may be placed or located at an area of interest, such as a workforce environment, jobsite, home, or any other location defined by perimeter 105. In one or more embodiments, the at least one scanner 110 may include a plurality of configurations to best assess the at least one wearable device 101, 180 within perimeter 150. For example, in at least one embodiment, the at least one scanner 110 may scan the entire perimeter 150 such that the at least one wearable device 101, 180 may continuously be detected by the at least one scanner 110. For example, in one or more embodiments, the at least one scanner 110 may scan a predefined portion of or sector within perimeter 150 where the at least one user 102, 170 may be located. In at least one embodiment, the at least one scanner 110 may scan the entire perimeter 150 such that the at least one wearable device 101,

180 may continuously be detected by a plurality of scanners 110, such as three scanners, such that triangulation occurs to pinpoint and locate the at least one user 102, 170 within the perimeter 150.

By way of one or more embodiments, the at least one scanner 110 may be placed within perimeter 150 at a predefined location, wherein the predefined location may be automatically remotely and wirelessly determined via a scanner placement algorithm within the database server 120. For example, in at least one embodiment, the scanner placement algorithm algorithm may determine the predefined location of the at least one scanner 110 based on one or more schematics or floor plans of the perimeter 150. One or more embodiments may include at least one portable scanner that may one or more of scan perimeter 150 to automatically determine a floor plan of the perimeter, determine an optimal location of the at least one scanner 110 based on one or more of the determined floor plan, size of the perimeter, obstructions within the perimeter and restrictions within the perimeter, and transmit the floor plan and the optimal location to the database server 120. In at least one embodiment, the at least one portable scanner may include a camera, such as a mobile phone camera. In one or more embodiments, a quality of the scan from the at least one portable scanner may be monitored and managed by the trust score algorithm. For example, in one or more embodiments, a user may use the at least one portable scanner to scan the perimeter 150, such that the user may be prompted by the database server 120 to submit the scan as a file to the API, for example. Once the API received the scan, in at least one embodiment, the file may be uploaded and translated using the scanner placement algorithm, wherein the scanner placement algorithm outlines the optimal location of where the at least one scanner 110 may be placed.

In one or more embodiments, the database server 120 may receive and save the floor plans and optimal locations as digital files. In at least one embodiment, the location algorithm may use virtual floor plans and area diagrams, and may determine the predefined location of the at least one scanner 110 based on customer pricing and collection preferences as collected from a customer, and/or based on one or more of a type of scanner, coordinates of the perimeter 150, and any other factors associated with perimeter 150 and assets thereof. In at least one embodiment, the customer may include one or more of the at least one user 102, the at least one other user 170, a supervisor or authoritative figure of the perimeter 150, and a government agency.

In one or more embodiments, the at least one scanner 110 may select a connection type, at 401, from one or more of an Ethernet connection 402, a cellular connection such as 3G/4G 403 and a WiFi connection 404. In one or more embodiments, the at least one scanner 110 may scan a perimeter, such as perimeter 150, for at least one wearable device, such as 101, 180, at 405, process the incoming data received from the at least one wearable device at 406, calculate a trust score of the incoming data received at 407, and determine accurate data capture of the incoming data received, at 408.

Figure 5:
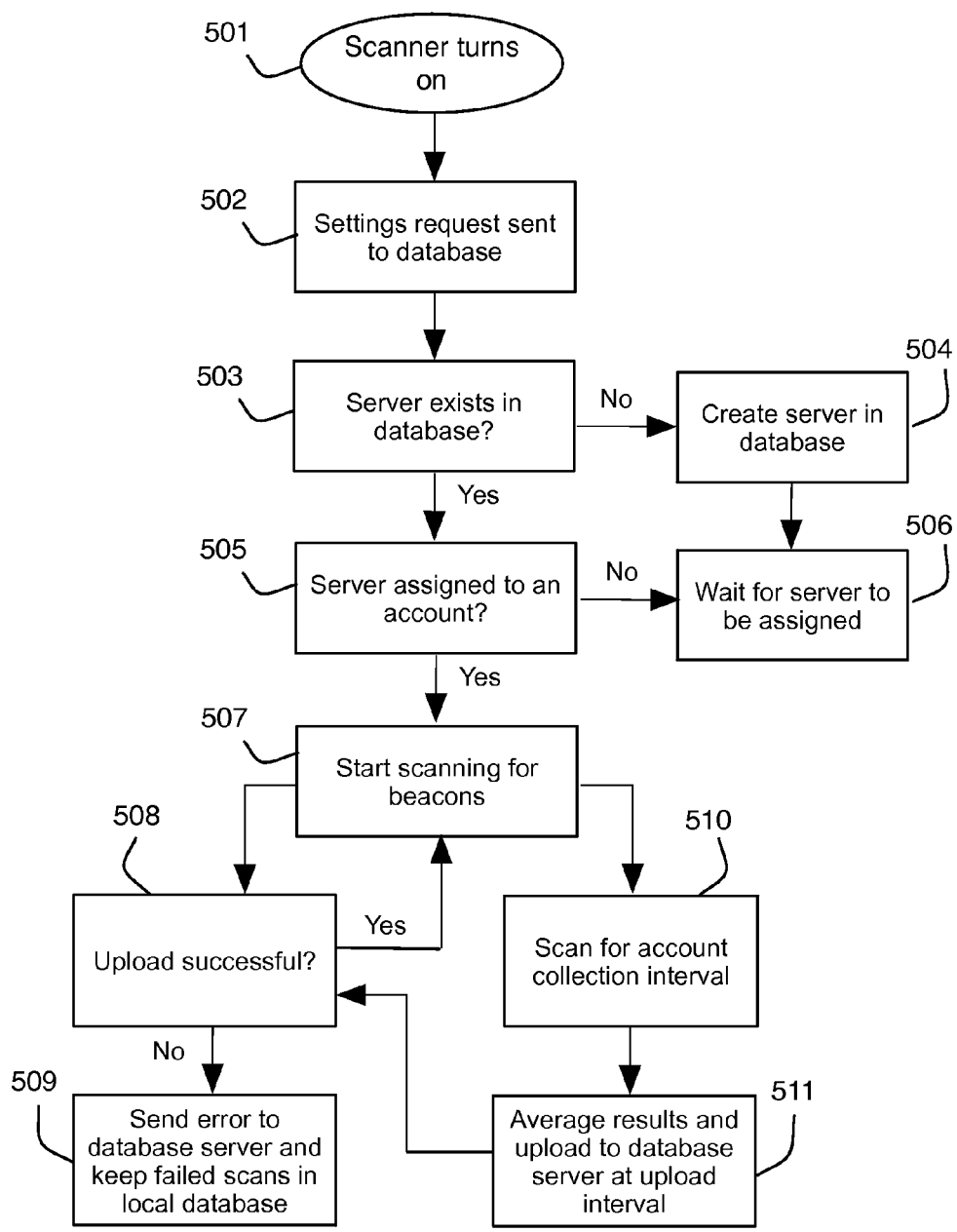
FIG. 5 illustrates an exemplary flowchart of the workforce data management system scanning process.

FIG. 5 illustrates an exemplary flowchart of the workforce data management system scanning process, according to one or more embodiments of the invention. As shown in FIG. 5, in at least one embodiment of the invention, the at least one scanner 110 turns on at 501 to immediately attempt to access a network to send a request to the database server 120. In one or more embodiments, the at least one scanner may transmit a setting request to the database at 502 to determine and ensure whether a server exists in the database corresponding to the at least one scanner 110 and the settings request, at 503. By way of one or more embodiments, if a server does not exist that corresponds to the at least one scanner 110, the at least one scanner 110 transmits a request to the database to create a corresponding server, at 504, wherein the request is created and queued to assign the at least one scanner 110 to a server and to an account in the customer account database 140. In at least one embodiment, if a server does exist that corresponds to the at least one scanner 110, at 505, the at least one scanner 110 determines if the server is assigned to an account associated with the at least one scanner 110. If an account is not assigned, at 506, the at least one scanner 110 waits for an account to be assigned. If an account is assigned, at 507, the at least one scanner 110 starts scanning a perimeter within a proximity, such as perimeter 150, for the at least one wearable device, such as 101, 180. In one or more embodiments, the at least one scanner 110 may scan the entire perimeter 150 or at least a portion of the perimeter 150, such as a room, building, area, etc., based on predefined settings previously set within the at least one scanner 110.

As such, in one or more embodiments, the at least one scanner 110 may transmit outgoing data packets to each of the at least one wearable device, such as 101, 180, to detect the unique identifier of each of the at least one wearable device, and receive incoming data packets from each of the at least one wearable device 101, 180. In one or more embodiments, the at least one scanner 110 may scan the perimeter 105, or a portion thereof, for a customer-specific time interval, such as a customer-specific interval associated with the at least one user 102, 170. In at least one embodiment, the results of the scan from the at least one scanner 110 may be averaged to include accurate distance results between the at least one scanner 110 and the at least one wearable device 101, 180. In one or more embodiments, the results may be saved on the at least one scanner 110 and/or may be uploaded to the database server 120 once a connection between the at least one scanner 110 and the database server 120 is established or reestablished. In at least one embodiment, the at least one scanner 110 determines if the at least one wearable device is capable of being scanned, at 508. In one or more embodiments, if the at least one scanner 110 is unable to scan the at least one wearable device to detect the unique identifier, such as from a failed scan, the at least one scanner 110 may send or transmit an error signal, such as an error message, to the database server 120, and may temporarily or permanently keep the failed scan in a local database in the at least one scanner 110, at 509. In one or more embodiments, the at least one scanner 110 may scan for at least one wearable device with an account collection interval associated with the at least one wearable device, as determined by the database server 120, at 510. In at least one embodiment, the at least one scanner 110 may average results of the scan for an account collection interval and upload the results to the database server at an upload interval, as predetermined by the database server 120, at 511.

In at least one embodiment of the invention, one or more of the at least one scanner 110 and the database server 120 may one or more of scan the at least one wearable device 101, 180, and assign each of the at least one wearable device 101, 180 to a dedicated universally unique identifier (UUID) to enable one or more of the at least one scanner 110 and the database server 120 to scan the at least one wearable device via the corresponding assigned dedicated UUID. In one or more embodiments, the at least one scanner 110 may generate a representational slate transfer (REST) hypertext transfer protocol (HTTP) POST to the database server 120, such as the API, with a list including one or more of the UUIDs, distance, major wearable devices, minor wearable devices and a timestamp of each of the at least one wearable device 101, 180.

According to at least one embodiment of the invention, the at least one scanner 110 may remotely assign a dedicated customer account of each of the at least one wearable device 101, 180 in the customer account database 130 by generating a REST HTTP POST to the database server 120, and handling a specific token type, such as an open standard authorization OAuth bearer token, the data server 120 returns. As such, in at least one embodiment, the at least one wearable device 101, 180 may be authenticated by the database server 120, authorizing access to the at least one wearable device 101, 180 and the at least one scanner 110 from the database server 120. In one or more embodiments, the database server 120 may generate a REST HTTP POST with authorization set to Bearer, for example an OAuth token, in HTTP headers.

By way of at least one embodiment, one or more of the database server 120 and the at least one scanner 110 may set a distance range and power capabilities of each of the at least one wearable device, such as 110, 180. In one or more embodiments, the at least one scanner 110 may transmit error messages to the database server 120, for example using a REST HTTP POST. In at least one embodiment of the invention, the at least one scanner 110 may maintain the connection between one or more of the at least one wearable device 101, 180 and the database server 120, such as the WiFi connection and the cellular connection, for long periods of time with automatic recovery. In one or more embodiments, when a signal connection of the WiFi and/or cellular connection is inactive, the at least one scanner 110 may queue data until the signal connection is recovered.

Figure 6:
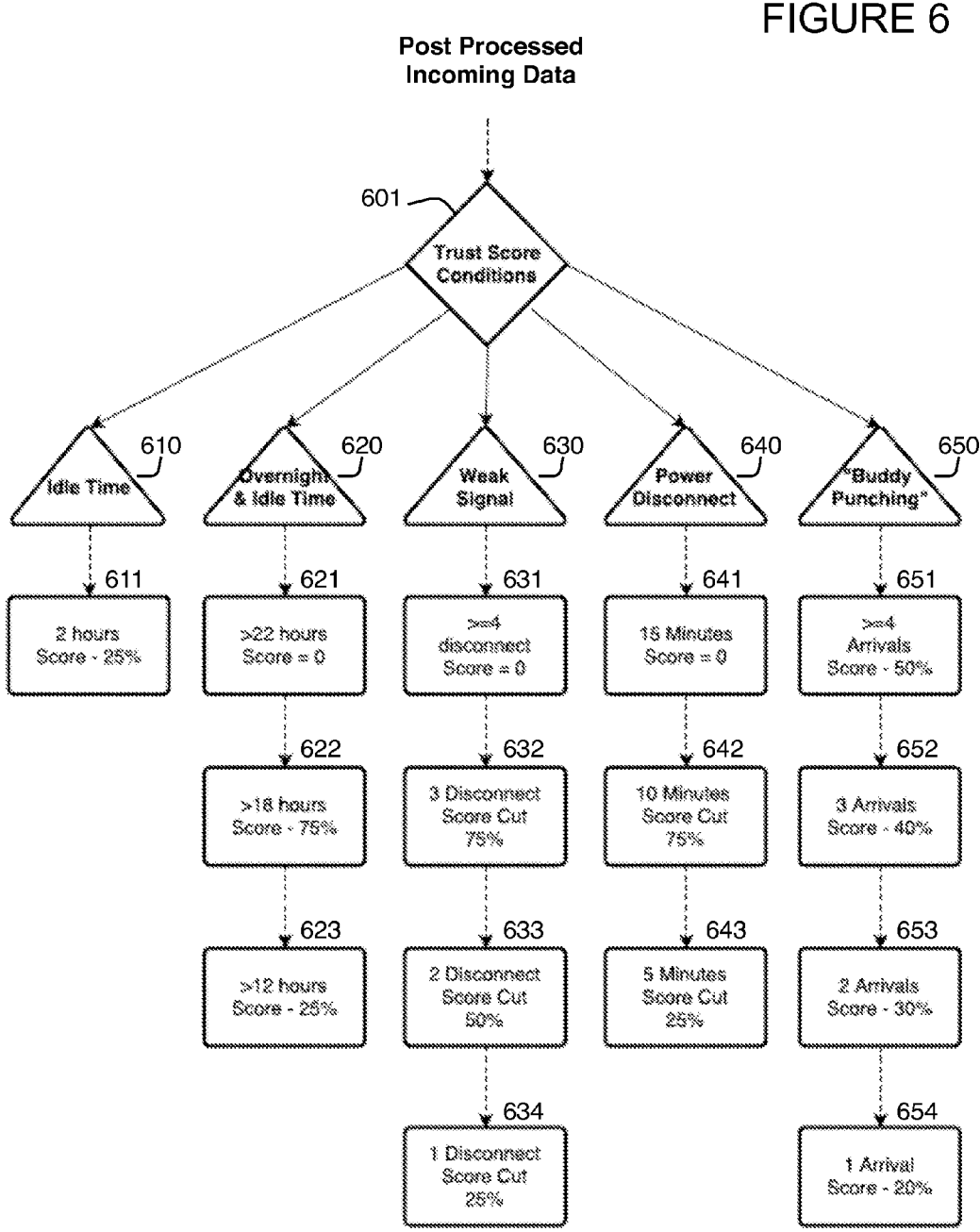
FIG. 6 illustrates an exemplary flowchart of the workforce data management system trust score calculation.

FIG. 6 illustrates an exemplary flowchart of the workforce data management system trust score calculation, according to one or more embodiments of the invention. In one or more embodiments, after the incoming data packets have been collected from the at least one scanner 110 and transmitted to the database server 120, the incoming data packets are processed, as discussed above, to further analyze the data. In at least one embodiment, the analysis may vary and may include tracking, such as historical patterns of the at least one wearable device 101, 180 over time, and/or cataloging, such as attendance of the at least one user 102, 170 or inventory of assets. In one or more embodiments, the analytics therefrom may be viewed in real-time through the database server 120, through a web application associated with the database server 120, through a mobile application associated with the database server 120, or any combination thereof. By way of at least one embodiment, as shown in FIG. 6, the trust score may be calculated based on one or more trust score conditions 601 of the incoming data packets after the incoming data packets have been processed as discussed above. In one or more embodiments, the trust score conditions 601 may be customized, predefined and set by the at least one user 102 and/or the at least one other user 170. In at least one embodiment, the at least one scanner 110 may vary the trust score based on the one or more trust score conditions 601, such that the accuracy trust score of the incoming data packets are varied by increasing or decreasing a default trust score associated with at least the portion of the incoming data packets.

In one or more embodiments, the one or more trust score conditions 601 may include an idle time 610, wherein the incoming data packets include an idle time of the at least one wearable device 101, 180. In at least one embodiment, the at least one scanner 110 may vary the trust score based on the idle time of the at least one wearable device 101, 180. As such, in at least one embodiment, when the idle time 610 of the at least one wearable device 101, 180 includes an idle time greater than or equal to a predefined idle time, the at least one scanner 110 may decrease the trust score by a predefined percentage associated with the predefined idle time. For example, as shown in FIG. 6 at 611, the predefined idle time may include two hours, such that the at least one scanner 110 may decrease the trust score by a predefined percentage of 25%.

In one or more embodiments of the invention, the one or more trust score conditions 601 may include an overnight idle time 620, wherein the incoming data packets include an idle time during overnight hours, or hours after a set pre-defined hours, of the at least one wearable device 101. In at least one embodiment, the at least one scanner 110 may vary the trust score based on the overnight idle time 620 of the at least one wearable device 101, 180. As such, in at least one embodiment, when the overnight idle time 620 of the at least one wearable device 101, 180 includes an overnight idle time greater than a first predefined overnight idle time, the at least one scanner 110 may decrease the trust score by a first predetermined percentage. For example, as shown in FIG. 6 at 621, the predefined overnight idle time 620 may include an overnight idle time greater than a first predefined overnight idle time of 22 hours, such that the at least one scanner 110 may decrease the trust score by a first predefined percentage of 100%, outputting an accuracy trust score of 0.

In one or more embodiments, when the overnight idle time 620 of the at least one wearable device 101 includes an overnight idle time 620 greater than a second predefined overnight idle time, the at least one scanner 110 may decrease the trust score by a second predetermined percentage. In at least one embodiment, the second predefined overnight idle time may be less than the first predefined overnight idle time, and the second predetermined percentage may be less than the first predetermined percentage. For example, as shown in FIG. 6 at 622, the predefined overnight idle time 620 may include an overnight idle time greater than a second predefined overnight idle time of 16 hours, such that the at least one scanner 110 may decrease the trust score by a second predefined percentage of 75%, resulting in a higher accuracy trust score than the corresponding trust score of the first predefined percentage.

By way of one or more embodiments, when the overnight idle time 620 includes an overnight idle time greater than a third predefined overnight idle time, the at least one scanner 110 may decrease the trust score by a third predetermined percentage. In at least one embodiment, the third predefined overnight idle time may be less than the first predefined overnight idle time and the second predefined overnight idle time, and the third predetermined percentage may be less than the first predetermined percentage and the second predetermined percentage. For example, as shown in FIG. 6 at 623, the predefined overnight idle time 620 may include an overnight idle time greater than a third predefined overnight idle time of 12 hours, such that the at least one scanner 110 may decrease the trust score by a third predefined percentage of 25%, resulting in a higher accuracy trust score than the corresponding trust scores of the first predefined percentage and the second predefined percentage.

In one or more embodiments of the invention, the one or more trust score conditions 601 may include a signal strength 630, wherein the incoming data packets include a signal strength of the at least one wearable device 101, 180. For example, the signal strength 630 may be associated with a weak signal. In at least one embodiment, the at least one scanner 110 may vary the trust score based on the signal strength of the at least one wearable device 101, 180. As such, in one or more embodiments, when the signal strength 630 of the at least one wearable device 101, 180 includes a high signal strength, the at least one scanner 110 may increase the trust score. For example, when the signal strength 630 of the at least one wearable device 101, 180 includes a high signal strength associated with zero signal disconnections, the at least one scanner 110 may increase the trust score.

In at least one embodiment, when the signal strength 630 of the at least one wearable device 101, 180 includes a signal strength greater than or equal to a first predefined strength value, the at least one scanner 110 may decrease the trust score by a first predetermined percentage. For example, as shown in FIG. 6 at 631, the signal strength 630 may include a signal strength greater than or equal to a first predefined strength value associated with four signal disconnections, such that the at least one scanner 110 may decrease the trust score by a first predetermined percentage of 100%, outputting an accuracy trust score of 0.

In one or more embodiments, when the signal strength 630 of the at least one wearable device 101, 180 includes a signal strength equal to a second predefined strength value, the at least one scanner 110 may decrease the trust score by a second predetermined percentage. In at least one embodiment, the second predefined strength value may be less than the first predefined strength value and the second predetermined percentage may be less than the first predetermined percentage. For example, as shown in FIG. 6 at 632, when the signal strength 630 of the at least one wearable device 101, 180 includes a signal strength equal to a second predefined strength value associated with three signal disconnections, the at least one scanner 110 may decrease the trust score by a second predetermined percentage of 75%, resulting in a higher accuracy trust score than the corresponding trust score of the first predetermined percentage.

In one or more embodiments, when the signal strength 630 of the at least one wearable device 101, 180 includes a signal strength equal to a third predefined strength value, the at least one scanner 110 may decrease the trust score by a third predetermined percentage. In at least one embodiment, the third predefined strength value may be less than the first predefined strength value and the second predefined strength value, and the third predetermined percentage may be less than the first predetermined percentage and the second predetermined percentage. For example, as shown in FIG. 6 at 633, when the signal strength 630 of the at least one wearable device 101, 180 includes a signal strength equal to a third predefined strength value associated with two signal disconnections, the at least one scanner 110 may decrease the trust score by a third predetermined percentage of 50%, resulting in a higher accuracy trust score than the corresponding trust scores of the first predetermined percentage and the second predetermined percentage.

In one or more embodiments, when the signal strength 630 of the at least one wearable device 101, 180 includes a signal strength equal to a fourth predefined strength value, the at least one scanner 110 may decrease the trust score by a fourth predetermined percentage. In at least one embodiment, the fourth predefined strength value may be less than the first predefined strength value, the second predefined strength value and the third predefined strength value, and the fourth predetermined percentage may be less than the first predetermined percentage, the second predetermined percentage and the third predetermined percentage. For example, as shown in FIG. 6 at 634, when the signal strength 630 of the at least one wearable device 101, 180 includes a signal strength equal to a fourth predefined strength value associated with one signal disconnection, the at least one scanner 110 may decrease the trust score by a fourth predetermined percentage of 25%, resulting in a higher accuracy trust score than the corresponding trust scores of the first predetermined percentage, the second predetermined percentage and the third predetermined percentage.

For example, in one or more embodiments, if the at least one user 102 wearing the at least one wearable device 101, 180 is located within perimeter 150, and the signal strength 630 is weak, the at least one scanner 110 may display trust score number affected by the weak signal. For example, in at least one embodiment, the predefined threshold over which the incoming data packets are accurate may include a pre-defined trust score, for example 25, such that if the incoming data packets collected and processed output an accuracy trust score of below the pre-defined trust score, for example 20, the collected incoming data packets may not automatically post to the designated customer account database 130, but may remain kept in a designated local database within the at least one scanner 110 as a record. Therefrom, in one or more embodiments, the at least one scanner 110 may notify at least one user, such as an assigned account administration associated with the customer account database 130, to address the collected and kept incoming data packets that were not automatically transmitted. As such, in at least one embodiment, the at least one other user may address the notification to edit the data, change the data, input additional data or transmit the data to another user or processor for further processing.

According to one or more embodiments, the one or more trust score conditions 601 may include a power disconnect 640, wherein the incoming data packets includes a power disconnect time of the at least one wearable device 101, 180. In at least one embodiment, the at least one scanner 110 may vary the trust score based on the power disconnect time of the at least one wearable device 101, 180. As such, in one or more embodiments, when the power disconnect time of the at least one wearable device 101 includes a power disconnect time equal to a first predefined disconnect length of time, the at least one scanner 110 may decrease the trust score by a first predetermined percentage. For example, as shown in FIG. 6 at 641, when the power disconnect time 640 of the at least one wearable device 101, 180 includes a power disconnect time equal to a first predefined disconnect length of time of 15 minutes, the at least one scanner 110 may decrease the trust score by a first predetermined percentage of 100%, outputting an accuracy trust score of 0.

In at least one embodiment, when the power disconnect time 640 of the at least one wearable device 101, 180 includes a power disconnect time equal to a second predefined disconnect length of time, wherein the second predefined disconnect length of time may be less than the first predefined disconnect length of time, the at least one scanner 110 may decrease the trust score by a second predetermined percentage. In at least one embodiment, the second predetermined percentage may be less than the first predetermined percentage. For example, as shown in FIG. 6 at 642, when the power disconnect time 640 of the at least one wearable device 101, 180 includes a power disconnect time equal to a second predefined disconnect length of time of 10 minutes, the at least one scanner 110 may decrease the trust score by a second predetermined percentage of 75%, resulting in a higher accuracy trust score than the corresponding trust score of the first predetermined percentage.

In one or more embodiments, when the power disconnect time 640 of the at least one wearable device 101, 180 includes a power disconnect time equal to a third predefined disconnect length of time, wherein the third predefined disconnect length of time may be less than the first predefined disconnect length of time and the second predefined disconnect length of time, the at least one scanner 110 may decrease the trust score by a third predetermined percentage. In one or more embodiments, the third predetermined percentage may be less than the first predetermined percentage and the second predetermined percentage. For example, as shown in FIG. 6 at 643, when the power disconnect time 640 of the at least one wearable device 101, 180 includes a power disconnect time equal to a third predefined disconnect length of time of 5 minutes, the at least one scanner 110 may decrease the trust score by a third predetermined percentage of 25%, resulting in a higher accuracy trust score than the corresponding trust scores of the first predetermined percentage and the second predetermined percentage.

By way of at least one embodiment of the invention, the one or more trust score conditions 601 may include buddy punching 650, wherein the buddy punching includes the at least one wearable device 101 arriving within a predefined proximity of another wearable device, such as another wearable device 180 of the at least one other user 170. In one or more embodiments, the incoming data packets may include an average number of buddy punches 650 that include an average number of arrivals between the at least one wearable device 101 and the another wearable device 180. In at least one embodiment, the at least one scanner 110 may vary the trust score based on the average number of arrivals. As such, in one or more embodiments, when the average number of arrivals includes a number greater than or equal to a first predefined number of arrivals, the at least one scanner 110 may decrease the trust score by a first predetermined percentage. For example, as shown in FIG. 6 at 651, when the average number of arrivals includes a number greater than or equal to a first predefined number of arrivals of four, the at least one scanner 110 may decrease the trust score by a first predetermined percentage of 50%.

In at least one embodiment, when the average number of arrivals includes a number equal to a second predefined number of arrivals, the at least one scanner 110 may decrease the trust score by a second predetermined percentage. In one or more embodiments, the second predefined number of arrivals may be less than the first predefined number of arrivals, and the second predetermined percentage may be less than the first predetermined percentage. For example, as shown in FIG. 6 at 652, when the average number of arrivals includes a number equal to a second predefined number of arrivals of three, the at least one scanner 110 may decrease the trust score by a second predetermined percentage of 40%, resulting in a higher accuracy trust score than the corresponding trust score of the first predetermined percentage.

In at least one embodiment, when the average number of arrivals includes a number equal to a third predefined number of arrivals, the at least one scanner 110 may decrease the trust score by a third predetermined percentage. In one or more embodiments, the third predefined number of arrivals may be less than the first predefined number of arrivals and the second predefined number of arrivals, and the third predetermined percentage may be less than the first predetermined percentage and the second predetermined percentage. For example, as shown in FIG. 6 at 653, when the average number of arrivals includes a number equal to a third predefined number of arrivals of two, the at least one scanner 110 may decrease the trust score by a third predetermined percentage of 30%, resulting in a higher accuracy trust score than the corresponding trust scores of the first predetermined percentage and the second predetermined percentage.

In at least one embodiment, when the average number of arrivals includes a number equal to a fourth predefined number of arrivals, the at least one scanner 110 may decrease the trust score by a fourth predetermined percentage. In one or more embodiments, the fourth predefined number of arrivals may be less than the first predefined number of arrivals, the second predefined number of arrivals and the third predefined number of arrivals, and the fourth predetermined percentage may be less than the first predetermined percentage, the second predetermined percentage and the third predetermined percentage. For example, as shown in FIG. 6 at 654, when the average number of arrivals includes a number equal to a fourth predefined number of arrivals of one, the at least one scanner 110 may decrease the trust score by a fourth predetermined percentage of 20%, resulting in a higher accuracy trust score than the corresponding trust scores of the first predetermined percentage, the second predetermined percentage and the third predetermined percentage.

By way of one or more embodiments, the one or more trust score conditions 601 and the predefined percentages to vary the trust score may be pre-customized, pre-determined and set by one or more of the at least one user 102 and the at least one other user 170. As such, in at least one embodiment, the one or more trust score conditions 601 and the predefined percentages to vary the trust score may include predefined variations associated with the at least one user 102 and the at least one other user 170 and/or predefined patterns that may be ignored. In at least one embodiment of the invention, the trust score algorithm may use default metrics to calculate the trust scores of each incoming data packet corresponding to one or more of the at least one user 102, 170, the one or more equipment associated with the at least one user 102, 170, and any assets within perimeter 150. In one or more embodiments, the metrics and the one or more trust score conditions 601 may be altered, added or deleted by the at least one user 102 and/or the at least one other user 170. In at least one embodiment, the results of the trust score algorithm and the variations of the trust scores, as discussed above, may be transmitted to the database server 120 and may include meta information that include data describing why the trust score was increased or lowered.

Figure 7:
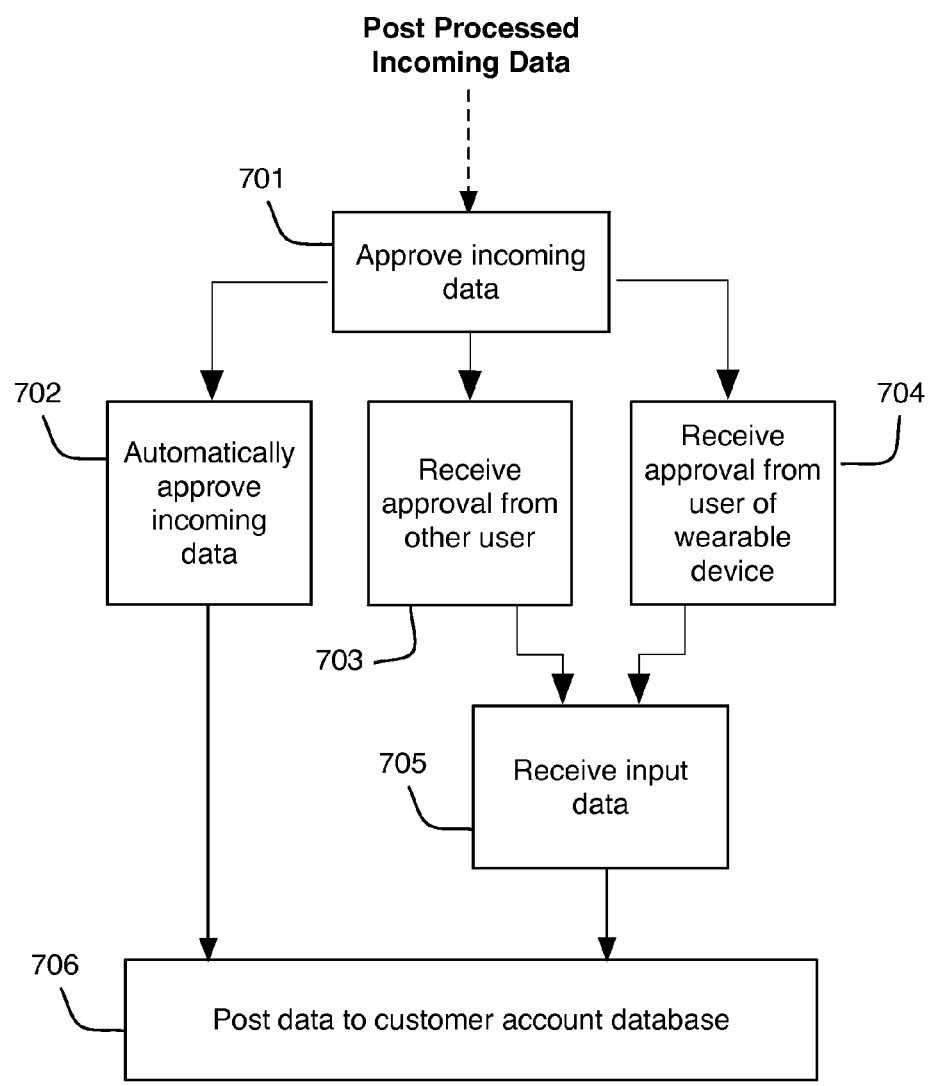
FIG. 7 illustrates an exemplary flowchart of the workforce data management system approval process.

FIG. 7 illustrates an exemplary flowchart of the workforce data management system approval process, according to one or more embodiments of the invention. By way of at least one embodiment, after the database server 120 receives the at least one portion of the incoming data packets, the database server 120 may approve the incoming data packets at 701. In one or more embodiments, the database server 120 may one or more of automatically approve the incoming data packets at 702, receive approval of the incoming data packets from at least one other user at 703, such as user 170, and receive approval of the incoming data packets from the at least one user 102 of the at least one wearable device 101, at 704. In at least one embodiment of the invention, the database server 120 receives approval of the incoming data packets from one or more of the at least one other user 170 and the at least one user 102, such that the database server 120 may receive input data, at 705, from the at least one other user 170, the at least one user 102 or both the at least one other user 170 and the at least one user 102. For example, in at least one embodiment, the input data may include one or more of editing or amending at least a portion of the incoming data packets, removing information from at least a portion of the incoming data packets, adding information to at least a portion of the incoming data packets, editing time or hours associated with the at least one user 102, 170, and applying the time or hours associated with the at least one user 102, 170 to at least one cost or job code within the database server 120.

In one or more embodiments, after approving the incoming data packets, the database server 102 may post the at least one portion of the incoming data packets, at 706, that include accurate data capture to a designated customer account of the plurality of customer accounts 140 in the customer account database 130 associated with one or more of the at least one user 102 and the at least one user other user 170.

One or more embodiments of the workforce data management system and method may include one or more of workforce time management, expense management, scheduling management, budget management and safety solutions management. In one or more embodiments, workforce time management may enable control of environments within a geographic, such as a virtual, fence polygon perimeter(s) with designated unique time collection of activities performed at a level of the at least one user 102 and/or the at least one other user 170, via the at least one scanner 110 and/or the database server 120. In at least one embodiment, workforce time management may enable unique polygon perimeter identification to engage in account administration associated with the location or movement of the at least one user 102 and/or the at least one other user 170, via the at least one scanner 110 and/or the database server 120. In one or more embodiments, expense management may include geographic location coordinates that are transmitted and uploaded to a centralized, for example cloud-based, web-application of purchases conducted within the geo-fence polygon perimeter(s), such as perimeter 150, via the at least one scanner 110 and/or the database server 120.

In at least one embodiment, schedule management may enable automatic generation of user schedules, such as of the at least one user 102 and/or the at least one other user 170 via one or more of the database server 120 and the API. In one or more embodiments, the schedules may be based on a mean or median value of time and activity recorded from within the geo-fence polygon perimeter(s), such as perimeter 150, associated with the at least one user 102 and/or the at least one other user 170 and any tasks associated with the at least one user 102 and/or the at least one other user 170. In at least one embodiment, the schedules may be transmitted to the centralized, for example cloud-based, web-application. In one or more embodiments, budget management may include automatic generation of budget forecasting, via one or more of the database server 120, the API and the centralized web-application, based on time and activity recorded and collected from within the geo-fence polygon perimeter(s), such as perimeter 150, via the at least one scanner 110. In at least one embodiment, safety solutions management may include safety monitoring of the at least one wearable device 101, 180. For example, in at least one embodiment, the at least one wearable device 101, 180 may be monitored to detect a state of the at least one wearable device 101, 180, such as an active state or in active state, to enable real-time notifications of the status of and/or errors associated with the at least one wearable device 101, 180, via the at least one scanner 110. In one or more embodiments, the notifications may include one or more of a short message service (SMS) notification, a smart message notification, a multimedia messaging service (MMS) notification and an e-mail notification directed at a remote user or database to enable monitoring, diagnosis and repair of the status and/or errors.

One or more embodiments of the workforce data management system and method may include one or more of security management, analytics management, home management, education management and navigation management. In at least one embodiment, security management may include asset management and access control of equipment directly or indirectly associated with one or more of the at least one user 102, the at least one other user 170, the perimeter 150 and equipment thereof. In one or more embodiments, asset management may include determination of pinpoint geographic location of assets in real-time associated with one or more of the at least one user 102, the at least one other user 170, the perimeter 150 and equipment thereof, via the at least one scanner 110. In at least one embodiment, asset management may include detection of movement of the assets within the geo-fence polygon perimeter(s), such as perimeter 150. As such, in one or more embodiments, the at least one scanner 110 may monitor equipment within the geo-fence polygon perimeter(s), such as perimeter 150. For example, in at least one embodiment, the at least one scanner 110 may monitor equipment within a job site or work place. Via the at least one scanner 110 and data server 120, at least one embodiment may include management of freights on-site within the geo-fence polygon perimeter(s), such as perimeter 150, for example to management import and export of equipment at port locations, airport locations and any other equipment transfer locations.

In one or more embodiments, access control management may include access of control systems via the at least one wearable device 101, 180. For example, in at least one embodiment, the at least one wearable device 101, 180 may enable hands-free entry access or doors and perimeters, for example using a multi-functional keychain wearable device. In one or more embodiments, the database server 120 may centralize, designate and pre-define access control functions of the at least one wearable device 101, 180. In at least one embodiment, the database server 120 may assign granted access to a single or a plurality of designated scanners of the at least one scanner 110 in multiple sectors of the perimeter 150. In one or more embodiments, access control management may include accessing smart functions within the perimeter 150, including one or more of climate control, windows and any Bluetooth® or wireless enabled device, via one or more of the at least one scanner 110 and the database server 120.

By way of at least one embodiment, analytics management may include heavy data collection of data packets from the at least one wearable device 101, 180 throughout the perimeter 150. As such, one or more embodiments may include a custom reporting engine, for example part of database server 120, that collects data based on deployment of the at least one wearable device 101, 180, and generate reports therefrom to allow users to collect historical data of the at least one user 102, the at least one other user 170, perimeter 150 and equipment thereof to forecast trending and future events. In at least one embodiment of the invention, forecasting trending and future events may be associated with one or more of tradeshows, exhibitions, private sector workforce, government programs, healthcare, manufacturing, media, etc.

In one or more embodiments, home management may include generation of smart zones that enable centralized multiple Bluetooth® and/or wireless functions within a perimeter, such as perimeter 150, including the at least one wearable device 101, 180 and the at least one scanner 110. In at least one embodiment, a smart zone within a home environment enables users, such as users 102, 170 within a perimeter of a house, such as perimeter 150 to trigger any Bluetooth® or wireless enabled device, such as the at least one wearable device 101, 180 to remotely operate one or more Bluetooth® enabled equipment located within the perimeter. For example, in one or more embodiments, a user, such as the at least one user 102, 170, may move within a predetermined sector within perimeter 150, such as a kitchen location, at a predefined time of day, which may trigger a Bluetooth® enabled piece of equipment 101, 180, such as a coffee maker, to turn on. For example, in one or more embodiments, the at least one user 102, 170 may move in a predefined posture for a predetermined period of time within a second predetermined sector within perimeter 150, such as in an upright posture in bed within a predefined room of the house, which may trigger a Bluetooth® enabled piece of equipment 101, 180, such as Bluetooth® enabled blinds of a window, to one or more of open or close, depending on the predefined time of day.

In one or more embodiments, education management may include generation of smart zones that enable educators, managers and other authoritative personnel to create an interactive learning environment in one or more of public and private sectors through custom triggers. For example, in at least one embodiment, a smart zone within a school environment enables users to approach at least one deployed device 101, 180 within a pre-defined space, such as perimeter 150, such that Bluetooth® or wireless enabled equipment or devices within the perimeter 150 recognize the nearby at least one deployed device 101, 180 triggering controlled information to be accessed and uploaded from the at least one deployed device 101, 180 to the Bluetooth® or wireless enabled equipment or devices within the perimeter 150. In at least one embodiment of the invention, the at least one wearable and/or deployable device 101, 180 may be used to transmit data to nearby Bluetooth® or wireless enabled equipment or devices to promote real-time messaging on local proximity. For example, the transmitted data may include breaking news, tourism, or any other information associated with the local proximity within the perimeter 150. For example, in one or more embodiments, a smart zone within a business environment enables users to internally and in real-time transmit information, for example of project or task information, from one Bluetooth® or wireless enabled equipment or device to another Bluetooth® or wireless enabled equipment or device, using the at least one wearable and/or deployable device 101, 180, such as a beacon.

In at least one embodiment of the invention, navigation management may include, via one or more of the at least one beacon 101, 180, the at least one scanner 110 and the database server 120, an indoor positioning system (IPS) to manage traffic of large physical space using an indoor navigation feature. For example, in at least one embodiment, the indoor positioning system may include step-by-step navigation that coordinates routes within the geo-fence polygon perimeter, such as perimeter 150. In one or more embodiments, navigation data may maintain accuracy via the at least one scanner 110 and the trust score algorithm. For example, in at least one embodiment, when an accuracy trust score drops below a required accuracy threshold, the database server 120 may refresh one or more of the at least one beacon 101, 180, the at least one scanner 110, the indoor positioning system (IPS) and data associated therewith.

It will be apparent to those skilled in the art that numerous modifications and variations of the described examples and embodiments are possible in light of the above teaching. The disclosed examples and embodiments are presented for purposes of illustration only. Other alternate embodiments may include some or all of the features disclosed herein. Therefore, it is the intent to cover all such modifications and alternate embodiments as may come within the true scope of this invention.

What is claimed is:

1. A workforce data management system comprising:
at least one wearable device configured to be worn on one or more of at least one user and at least one piece of equipment associated with said at least one user,
wherein each of said at least one wearable device comprises a unique identifier;
at least one scanner located remote to said to at least one wearable device,
wherein said at least one scanner is associated with said at least one wearable device, and wherein said at least one scanner
scans a predefined geographical perimeter to locate said at least one wearable device, and
bi-directionally communicates with said at least one wearable device to collect and record data from each of said at least one wearable device, and,
wherein said at least one scanner comprises a trust score algorithm; and,
a database server located remote to said at least one wearable device and said at least one scanner,
wherein said database server bi-directionally communicates with said at least one scanner, and
wherein said database server comprises a customer account database comprising a plurality of customer accounts associated with said at least one user;
wherein said at least one scanner
emits a pre-defined radius to identify an area of interest around said at least one wearable device,
scans said area of interest to detect said at least one wearable device,
transmits outgoing data packets to each of said at least one wearable device to detect the unique identifier of each of said at least one wearable device,
receives incoming data packets from each of said at least one wearable device,
processes the incoming data packets by
filtering the incoming data packets into a ranking system to qualify accuracy of said incoming data packets associated with said at least one wearable device, and, after said filters the incoming data packets
determining whether at least one portion of the incoming data packets comprise accurate data capture, and,
calculates a trust score of said at least one portion of said incoming data packets via said trust score algorithm, wherein
when the at least one portion of the incoming data packets comprise accurate data capture, the at least one scanner outputs a corresponding trust score and transmits the at least one portion of the incoming data packets that comprise accurate data capture to said database server, and, when the at least one portion of the incoming data packets comprise inaccurate data capture, the at least one scanner outputs a corresponding trust score and awaits further action from the at least one wearable device, keeps the at least one portion of the incoming data packets that comprises inaccurate data capture in a local database within the at least one scanner, and, notifies at least one other user associated with the customer account database to address said at least one portion of the incoming data that comprises inaccurate data capture in the local database; and, wherein said database server receives the at least one portion of the incoming data packets that comprise accurate data capture, posts the at least one portion of the incoming data packets that comprise accurate data capture to a designated customer account of said plurality of customer accounts in said customer account database associated with said at least one user, and, processes the at least one portion of the incoming data packets that comprise accurate data to further analyze the incoming data packets comprising one or more of tracking historical patterns of the at least one wearable device over time cataloging attendance of the at least one user, and cataloging inventory of assets within the pre-defined geographical perimeter.

2. The workforce data management system of claim 1, wherein said at least one wearable device comprises a low-energy wireless beacon device.

3. The workforce data management system of claim 1, wherein said at least one scanner comprises a low-energy geo-fence scanner that scans a virtual radius defined by said predetermined geographical perimeter.

4. The workforce data management system of claim 1, wherein said ranking system comprises an accuracy score calculator, wherein said accuracy score calculator comprises a predefined threshold over which said incoming data packets are accurate, such that said at least one scanner filters said incoming data packets based on said predefined threshold and outputs an accuracy score therefrom.

5. The workforce data management system of claim 1, wherein said trust score is calculated based on one or more trust score conditions.

6. The workforce data management system of claim 5, wherein said one or more trust score conditions comprises idle time, wherein said incoming data packets comprise an idle time of said at least one wearable device, and wherein said at least one scanner varies said trust score based on said idle time of said at least one wearable device, such that when said idle time of said at least one wearable device comprises an idle time greater than or equal to a predefined idle time, said at least one scanner decreases the trust score by a predefined percentage associated with said predefined idle time.

7. The workforce data management system of claim 5, wherein said one or more trust score conditions comprises an overnight idle time, wherein said incoming data packets comprises an overnight idle time of said at least one wearable device, and wherein said at least one scanner varies said trust score based on said overnight idle time of said at least one wearable device, such that when said overnight idle time of said at least one wearable device comprises an overnight idle time greater than a first predefined overnight idle time, said at least one scanner decreases the trust score by a first predetermined percentage, when said overnight idle time of said at least one wearable device comprises an overnight idle time greater than a second predefined overnight idle time, wherein said second predefined overnight idle time is less than said first predefined overnight idle time, said at least one scanner decreases the trust score by a second predetermined percentage, wherein said second predetermined percentage is less than said first predetermined percentage, and, when said overnight idle time comprises an overnight idle time greater than a third predefined overnight idle time, wherein said third predefined overnight idle time is less than said first predefined overnight idle time and said second predefined overnight idle time, said at least one scanner decreases the trust score by a third predetermined percentage, wherein said third predetermined percentage is less than said first predetermined percentage and said second predetermined percentage.

8. The workforce data management system of claim 5, wherein said one or more trust score conditions comprises a signal strength, wherein said incoming data packets comprises a signal strength of said at least one wearable device, and wherein said at least one scanner varies said trust score based on said signal strength of said at least one wearable device, such that when said signal strength of said at least one wearable device comprises a high signal strength, said at least one scanner increases the trust score, when said signal strength of said at least one wearable device comprises a signal strength greater than or equal to a first predefined strength value, said at least one scanner decreases the trust score by a first predetermined percentage, when said signal strength of said at least one wearable device comprises a signal strength equal to a second predefined strength value, wherein said second predefined strength value is less than said first predefined strength value, said at least one scanner decreases the trust score by a second predetermined percentage, wherein said second predetermined percentage is less than said first predetermined percentage, when said signal strength of said at least one wearable device comprises a signal strength equal to a third predefined strength value, wherein said third predefined strength value is less than said first predefined strength value and said second predefined strength value, said at least one scanner decreases the trust score by a third predetermined percentage, wherein said third predetermined percentage is less than said first predetermined percentage and said second predetermined percentage, and, when said signal strength of said at least one wearable device comprises a signal strength equal to a fourth predefined strength value, wherein said fourth predefined strength value is less than said first predefined strength value, said second predefined strength value and said third predefined strength value, said at least one scanner decreases the trust score by a fourth predetermined percentage, wherein said fourth predetermined percentage is less than said first predetermined percentage, said second predetermined percentage and said third predetermined percentage.

9. The workforce data management system of claim 5, wherein said one or more trust score conditions comprises a power disconnect, wherein said incoming data packets comprises a power disconnect time of said at least one wearable device, and wherein said at least one scanner varies said trust score based on said power disconnect time of said at least one wearable device, such that
- when said power disconnect time of said at least one wearable device comprises a power disconnect time equal to a first predefined disconnect length of time, said at least one scanner decreases the trust score by a first predetermined percentage,
- when said power disconnect time of said at least one wearable device comprises a power disconnect time equal to a second predefined disconnect length of time, wherein said second predefined disconnect length of time is less than said first predefined disconnect length of time, said at least one scanner decreases the trust score by a second predetermined percentage, wherein said second predetermined percentage is less than said first predetermined percentage, and,
- when said power disconnect time of said at least one wearable device comprises a power disconnect time equal to a third predefined disconnect length of time, wherein said third predefined disconnect length of time is less than said first predefined disconnect length of time and said second predefined disconnect length of time, said at least one scanner decreases the trust score by a third predetermined percentage, wherein said third predetermined percentage is less than said first predetermined percentage and said second predetermined percentage.

10. The workforce data management system of claim 5, wherein said one or more trust score conditions comprises buddy punching, wherein said buddy punching comprises said at least one wearable device arriving within a predefined proximity of another wearable device, wherein said incoming data packets comprises an average number of buddy punches comprising an average number of arrivals between said at least one wearable device and said another wearable device, and wherein said at least one scanner varies said trust score based on said average number of arrivals, such that
- when said average number of arrivals comprises a number greater than or equal to a first predefined number of arrivals, said at least one scanner decreases the trust score by a first predetermined percentage,
- when said average number of arrivals comprises a number equal to a second predefined number of arrivals, wherein said second predefined number of arrivals is less than said first predefined number of arrivals, said at least one scanner decreases the trust score by a second predetermined percentage, wherein said second predetermined percentage is less than said first predetermined percentage,
- when said average number of arrivals comprises a number equal to a third predefined number of arrivals, wherein said third predefined number of arrivals is less than said first predefined number of arrivals and said second predefined number of arrivals, said at least one scanner decreases the trust score by a third predetermined percentage, wherein said third predetermined percentage is less than said first predetermined percentage and said second predetermined percentage, and,
- when said average number of arrivals comprises a number equal to a fourth predefined number of arrivals, wherein said fourth predefined number of arrivals is less than said first predefined number of arrivals, said second predefined number of arrivals and said third predefined number of arrivals, said at least one scanner decreases the trust score by a fourth predetermined percentage, wherein said fourth predetermined percentage is less than said first predetermined percentage, said second predetermined percentage and said third predetermined percentage.

11. The workforce data management system of claim 1, wherein said at least one scanner comprises a plurality of scanners,
- wherein each of said plurality of scanners emit a predefined radius to identify a sector of interest around said at least one wearable device,
- wherein said sector of interest comprises at least said area of interest, such that each of said plurality of scanners bi-directionally communicates with said at least one wearable device, and,
- wherein each of said plurality of scanners comprises a unique identifier.

12. The workforce data management system of claim 1, wherein after said database server receives the at least one portion of the incoming data packets, said database server one or more of automatically approves said incoming data packets, receives approval of said incoming data packets from the at least one other user, and receives approval of said incoming data packets from said at least one user.

13. The workforce data management system of claim 12, wherein said database server receives approval of said incoming data packets from one or more of said at least one other user and said at least one user comprises wherein said database server receives input data from said at least one other user, said at least one user or both said at least one other user and said at least one user.

14. A method of workforce data management comprising:
- scanning a predefined geographical perimeter to locate at least one wearable device via at least one scanner located remote to said at least one wearable device,
    - wherein said at least one wearable device is configured to be worn on one or more of at least one user and at least one piece of equipment associated with said at least one user,
    - wherein each of said at least one wearable device comprises a unique identifier,
    - wherein said at least one scanner is associated with said at least one wearable device, and,
    - wherein said at least one scanner comprises a trust score algorithm;
- bi-directionally communicating with said at least one wearable device via said at least one scanner;
- collecting and recording data from each of said at least one wearable device via said at least one scanner;
- bi-directionally communicating with a database server via said at least one scanner,
    - wherein said database server is located remote to said at least one wearable device and said at least one scanner;
    - wherein said database server comprises a customer account database comprising a plurality of customer accounts associated with said at least one user;
- emitting a pre-defined radius to identify an area of interest around said at least one wearable device via said at least one scanner;
- scanning said area of interest to detect said at least one wearable device via said at least one scanner;
- transmitting outgoing data packets to each of said at least one wearable device to detect the unique identifier of each of said at least one wearable device via said at least one scanner;

receiving incoming data packets from each of said at least one wearable device via said at least one scanner;
processing the incoming data packets via said at least one scanner by
filtering the incoming data packets into a ranking system to qualify accuracy of said incoming data packets associated with said at least one wearable device via said at least one scanner, and, after filtering the incoming data packets
determining whether at least one portion of the incoming data packets comprise accurate data capture via said at least one scanner;
calculating a trust score of said at least one portion of said incoming data packets via said trust score algorithm, wherein
when the at least one portion of the incoming data packets comprise accurate data capture, outputting a corresponding trust score and transmitting the at least one portion of the incoming data packets that comprise accurate data capture to said database via said at least one scanner, and,
when the at least one portion of the incoming data packets comprise inaccurate data capture,
outputting a corresponding trust score and awaiting further action from the at least one wearable device via said at least one scanner,
keeping the at least one portion of the incoming data packets that comprises inaccurate data capture in a local database within the at least one scanner, and,
notifying at least one other user associated with the customer account database to address said at least one portion of the incoming data that comprises inaccurate data capture in the local database via said at least one scanner;
receiving the at least one portion of the incoming data packets that comprise accurate data capture via said at database server;
posting the at least one portion of the incoming data packets that comprise accurate data capture to a designated customer account of said plurality of customer accounts in said customer account database associated with said at least one user via said database server; and,
processing the at least one portion of the incoming data packets that comprise accurate data to further analyze the incoming data packets comprising one or more of tracking historical patterns of the at least one wearable device over time, cataloging attendance of the at least one user, and cataloging inventory of assets within the pre-defined geographical perimeter via said database server.

15. The method of workforce data management of claim 14, wherein said trust score is calculated based on one or more trust score conditions.

16. The method of workforce data management of claim 15, wherein said one or more trust score conditions comprises idle time, and wherein said incoming data packets comprise an idle time of said at least one wearable device, and varying said trust score based on said idle time of said at least one wearable device via said at least one scanner, such that
when said idle time of said at least one wearable device comprises an idle time greater than or equal to a predefined idle time, decreasing the trust score by a predefined percentage associated with said predefined idle time via said at least one scanner.

17. The method of workforce data management of claim 15, wherein said one or more trust score conditions comprises an overnight idle time, and wherein said incoming data packets comprises an overnight idle time of said at least one wearable device, and varying said trust score based on said overnight idle time of said at least one wearable device via said at least one scanner, such that
when said overnight idle time of said at least one wearable device comprises an overnight idle time greater than a first predefined overnight idle time, decreasing the trust score by a first predetermined percentage via said at least one scanner,
when said overnight idle time of said at least one wearable device comprises an overnight idle time greater than a second predefined overnight idle time, wherein said second predefined overnight idle time is less than said first predefined overnight idle time, decreasing the trust score by a second predetermined percentage via said at least one scanner, wherein said second predetermined percentage is less than said first predetermined percentage, and,
when said overnight idle time comprises an overnight idle time greater than a third predefined overnight idle time, wherein said third predefined overnight idle time is less than said first predefined overnight idle time and said second predefined overnight idle time, decreasing the trust score by a third predetermined percentage via said at least one scanner, wherein said third predetermined percentage is less than said first predetermined percentage and said second predetermined percentage.

18. The method of workforce data management of claim 15, wherein said one or more trust score conditions comprises a signal strength, and wherein said incoming data packets comprises a signal strength of said at least one wearable device, and varying said trust score based on said signal strength of said at least one wearable device via said at least one scanner, such that
when said signal strength of said at least one wearable device comprises a high signal strength, increasing the trust score via said at least one scanner,
when said signal strength of said at least one wearable device comprises a signal strength greater than or equal to a first predefined strength value, decreasing the trust score by a first predetermined percentage via said at least one scanner,
when said signal strength of said at least one wearable device comprises a signal strength equal to a second predefined strength value, wherein said second predefined strength value is less than said first predefined strength value, decreasing the trust score by a second predetermined percentage via said at least one scanner, wherein said second predetermined percentage is less than said first predetermined percentage,
when said signal strength of said at least one wearable device comprises a signal strength equal to a third predefined strength value, wherein said third predefined strength value is less than said first predefined strength value and said second predefined strength value, decreasing the trust score by a third predetermined percentage via said at least one scanner, wherein said third predetermined percentage is less than said first predetermined percentage and said second predetermined percentage, and,
when said signal strength of said at least one wearable device comprises a signal strength equal to a fourth predefined strength value, wherein said fourth predefined strength value is less than said first predefined strength value, said second predefined strength value and said third predefined strength value, decreasing the trust score by a fourth predetermined percentage via said at least one scanner, wherein said fourth predetermined percentage is less than said first predetermined percentage, said second predetermined percentage and said third predetermined percentage.

19. The method of workforce data management of claim 15, wherein said one or more trust score conditions comprises a power disconnect, and wherein said incoming data packets comprises a power disconnect time of said at least one wearable device, and varying said trust score based on said power disconnect time of said at least one wearable device via said at least one scanner, such that when said power disconnect time of said at least one wearable device comprises a power disconnect time equal to a first predefined disconnect length of time, decreasing the trust score by a first predetermined percentage via said at least one scanner, when said power disconnect time of said at least one wearable device comprises a power disconnect time equal to a second predefined disconnect length of time, wherein said second predefined disconnect length of time is less than said first predefined disconnect length of time, decreasing the trust score by a second predetermined percentage via said at least one scanner, wherein said second predetermined percentage is less than said first predetermined percentage, and, when said power disconnect time of said at least one wearable device comprises a power disconnect time equal to a third predefined disconnect length of time, wherein said third predefined disconnect length of time is less than said first predefined disconnect length of time and said second predefined disconnect length of time, decreasing the trust score by a third predetermined percentage via said at least one scanner, wherein said third predetermined percentage is less than said first predetermined percentage and said second predetermined percentage.

20. The method of workforce data management of claim 15, wherein said one or more trust score conditions comprises buddy punching, and wherein said buddy punching comprises said at least one wearable device arriving within a predefined proximity of another wearable device, wherein said incoming data packets comprises an average number of buddy punches comprising an average number of arrivals between said at least one wearable device and said another wearable device, and varying said trust score based on said average number of arrivals via said at least one scanner, such that when said average number of arrivals comprises a number greater than or equal to a first predefined number of arrivals, decreasing the trust score by a first predetermined percentage via said at least one scanner, when said average number of arrivals comprises a number equal to a second predefined number of arrivals, wherein said second predefined number of arrivals is less than said first predefined number of arrivals, decreasing the trust score by a second predetermined percentage via said at least one scanner, wherein said second predetermined percentage is less than said first predetermined percentage, when said average number of arrivals comprises a number equal to a third predefined number of arrivals, wherein said third predefined number of arrivals is less than said first predefined number of arrivals and said second predefined number of arrivals, decreasing the trust score by a third predetermined percentage via said at least one scanner, wherein said third predetermined percentage is less than said first predetermined percentage and said second predetermined percentage, and, when said average number of arrivals comprises a number equal to a fourth predefined number of arrivals, wherein said fourth predefined number of arrivals is less than said first predefined number of arrivals, said second predefined number of arrivals and said third predefined number of arrivals, decreasing the trust score by a fourth predetermined percentage via said at least one scanner, wherein said fourth predetermined percentage is less than said first predetermined percentage, said second predetermined percentage and said third predetermined percentage.

\* \* \* \* \*